United States Patent

Stenson

[15] 3,642,156
[45] Feb. 15, 1972

[54] PICKUP TRUCK LOADING RAMP

[72] Inventor: Raymond A. Stenson, Route #2, Box 38, Rugby, N. Dak. 58368

[22] Filed: Mar. 16, 1970

[21] Appl. No.: 19,722

[52] U.S. Cl................................................214/85, 296/61
[51] Int. Cl............................................................B60p 1/00
[58] Field of Search...................214/85, 85.1; 14/71; 296/61

[56] References Cited

UNITED STATES PATENTS

| 3,352,440 | 11/1967 | Wilson | 214/85 |
| 3,339,968 | 9/1967 | Hall | 296/61 |
| 712,284 | 10/1902 | Fisher | 214/85 |
| 276,685 | 5/1883 | Harley | 214/85 |
| 1,699,882 | 1/1929 | Ferguson | 214/85 |
| 3,510,015 | 5/1970 | Roshaven | 214/85 |

Primary Examiner—Albert J. Makay
Attorney—Robert E. Kleve

[57] ABSTRACT

A folding ramp device for attachment to the rear gate of pickup trucks. This device is of such construction so as it may fold up while not interfering with the normal use of the endgate of the truck. The device includes a multiple number of folding members which are hinged to make a convenient ramp for any hard to load items, such as garden tractors, snowmobiles, etc.

1 Claims, 5 Drawing Figures

PATENTED FEB 15 1972 3,642,156
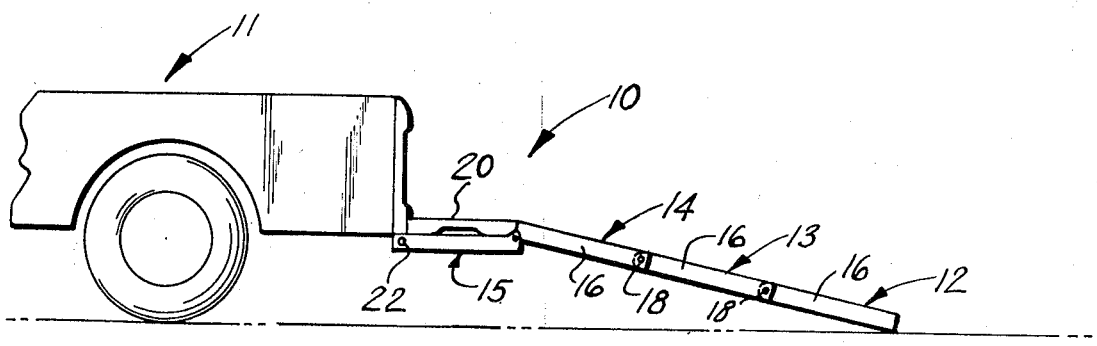
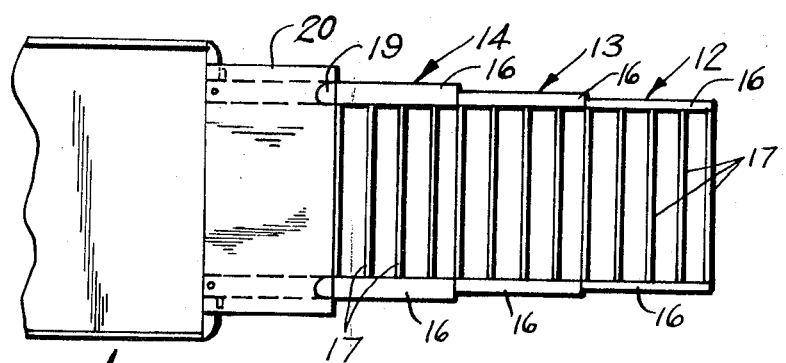
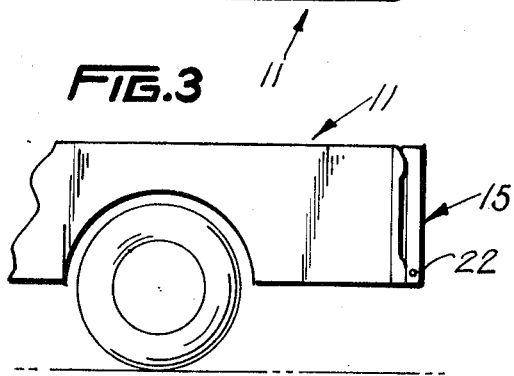
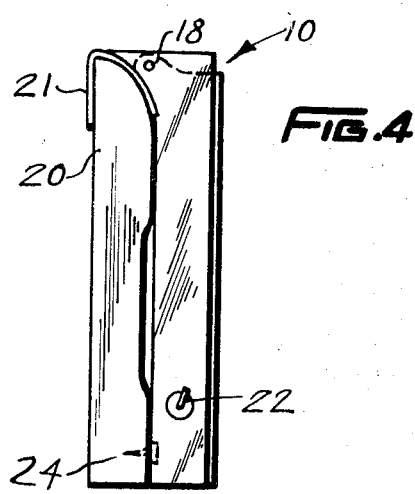
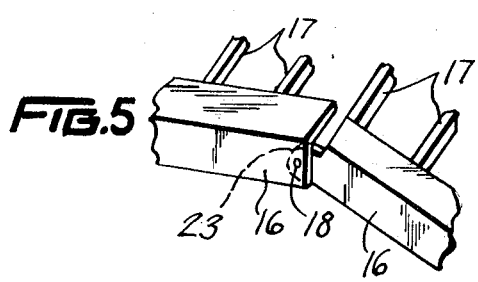
INVENTOR.
RAYMOND A. STENSON

PICKUP TRUCK LOADING RAMP

This invention relates to ramplike devices for trucks and the like.

It is therefore the main purpose of this invention to provide a loading ramp for pickup trucks which will be attached to the tailgate portion of the truck in order to accommodate the loading of garden tractors, snow sleds and other devices which are normally hard to get onto a pickup truck.

Another object of this invention is to provide a loading ramp which will have a plurality of folding sections, each of the folding sections being smaller than the previous in order that the device will fold compactly.

A further object of this invention is to provide a loading ramp of the type described which will remain rigid when in its extended position in order to facilitate the loading of machinery and the like.

Other objects of the present invention is to provide a pickup truck loading ramp which is simple in design, rugged in construction, inexpensive to manufacture, easy to use and efficient in operation.

These and other objects will become readily evident upon a study of the following specification and the accompanying drawing wherein:

FIG. 1 is a side view of the present invention shown in its full extended position;

FIG. 2 is a top plan view of FIG. 1;

FIG. 3 is a side view of the device shown fully folded;

FIG. 4 is an enlarged side elevation view of the device shown fully folded and removed from the truck body; and FIG. 5 is a fragmentary perspective view of two of the folding elements of the invention.

According to this invention, a loading ramp 10 for pickup truck 11 is shown to include folding members 12, 13, 14 and 15 which are constructed of rails 16 which are parallel spaced apart and secured to crossbar members 17, the rails 16 being secured by hinge pins 18 allowing for member 12 to fold into 13 and 13, to fold into 14 and so on. Member 15 is provided with tabs 19 on each side which provide securement means for ramp 10 to tailgate 20 of pickup truck 11. 21 in FIG. 4 is the side of tab 19.

It shall be noted that ramp 10 is also provided with a locking bolt 22 so that when ramp 10 in it's fully folded position, it will provide securement means for the members 12, 13, 14, and 15.

It shall further be noted that rails 16 of loading ramp 10 are of L-shaped cross-sectional configuration and the lug portions 23 of rails 16 being extended and carrying hinge pins 18, will allow for the ends of rails 16 when extended outwards away from truck 11, to overlappingly engage each other in order to prevent sagging of ramp 10 by imparting rigidity thereto. A sheet metal screw 24 serves to secure member 15 to the tailgate of pickup truck 11.

What I now claim is:

1. A loading ramp for trucks having an end gate, said ramp comprising at least three foldable hinged together ramp members, each of said ramp members having a pair of elongated side beams, each of said side beams in each ramp member comprising a pair of elongated diverging flanges forming an L-shaped cross section with one of said flanges extending vertically and the other of said flanges extending inwardly toward one another, a plurality of spaced elongated crossbars extending in length between each of said pairs of side beams, said ramp members extending rearwardly in length from the rearward end of the truck with each rearward succeeding ramp member being smaller in width than the preceding ramp member including their side beams having the L-shaped cross sections, so that the ramp members will fold forward into one another about their hinged connection into at least substantially parallel relation to one another and against the truck and gate, strap means mounted to said ramp to attach said ramp to said endgate of said truck, said ramp members when folded together against said endgate being substantially the same height as said endgate.

\* \* \* \* \*